(12) United States Patent
Breeuwer

(10) Patent No.: US 7,020,311 B2
(45) Date of Patent: Mar. 28, 2006

(54) RELIABILITY MEASURE CONCERNING THE REGISTRATION OF CARDIAC MR PERFUSION MEASUREMENTS

(75) Inventor: Marcel Breeuwer, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 584 days.

(21) Appl. No.: 10/059,430

(22) Filed: Jan. 29, 2002

(65) Prior Publication Data
US 2002/0136438 A1 Sep. 26, 2002

(30) Foreign Application Priority Data
Feb. 2, 2001 (EP) .................................. 01200382

(51) Int. Cl.
*G06K 9/00* (2006.01)
(52) U.S. Cl. .................... 382/128; 382/294; 378/28
(58) Field of Classification Search ........ 382/128–133, 382/151, 169–172, 178, 194, 209, 255, 260, 382/274, 278, 285–294, 305; 600/410, 413, 600/425, 427; 378/23, 28; 356/39; 250/453.11; 348/43, 46; 128/200.16
See application file for complete search history.

(56) References Cited
U.S. PATENT DOCUMENTS

| | | | |
|---|---|---|---|
| 5,633,951 A | | 5/1997 | Moshfeghi .................. 382/154 |
| 5,647,360 A | * | 7/1997 | Bani-Hashemi et al. .... 600/425 |
| 5,850,486 A | * | 12/1998 | Maas et al. ................. 382/294 |
| 5,907,628 A | | 5/1999 | Yolles et al. ................ 382/149 |
| 5,970,182 A | * | 10/1999 | Goris ......................... 382/278 |
| 6,222,948 B1 | * | 4/2001 | Hossack et al. ............ 382/294 |
| 6,292,683 B1 | * | 9/2001 | Gupta et al. ................ 600/410 |
| 6,447,450 B1 | * | 9/2002 | Olstad ........................ 600/437 |
| 6,501,979 B1 | * | 12/2002 | Manning et al. ............ 600/413 |

FOREIGN PATENT DOCUMENTS

| | | |
|---|---|---|
| WO | WO9717894 | 5/1997 |
| WO | WO0024316 | 4/2000 |

OTHER PUBLICATIONS

Declerck et al: "Automatic Registration And Alignment On A Template Of Cardiac Stress And Rest Reoriented SPECT Images" IEEE Transactions On Medical Imaging, IEEE Inc., vol. 16, No. '6, Dec. 1, 1997, pp. 727-737.*

G Stalidis et al: "Parametric 4D Modeling of Myocardial Surface Motion Applied to MRI Data", Lab of Medical Information, Dept of Electrical Engng, AHEPA University Hodpital, Aristotle University, Thessaloniki, Greece 1997 IEEE Inc., pp. 319-322.*

"An ECG Trigger Module for the Acquisition of Cardiac MR Images", Computers in Cardiology, 1994, pp. 533-536.

* cited by examiner

*Primary Examiner*—Daniel Miriam
*Assistant Examiner*—Seyed Azarian

(57) ABSTRACT

A method is developed for automatic analysis of the reliability of an automatic registration of perfusion cardiovascular MR images. A parameter, for example, a similarity measure between the successive images, is calculated first in order to quantify the success of the registration process between these images for the data set. A criterion is then introduced, for example a threshold is imposed on the similarity measure. The successively registered images that have a calculated similarity measure that exceeds the defined threshold are automatically accepted for further analysis.

15 Claims, 2 Drawing Sheets

Figure 1:
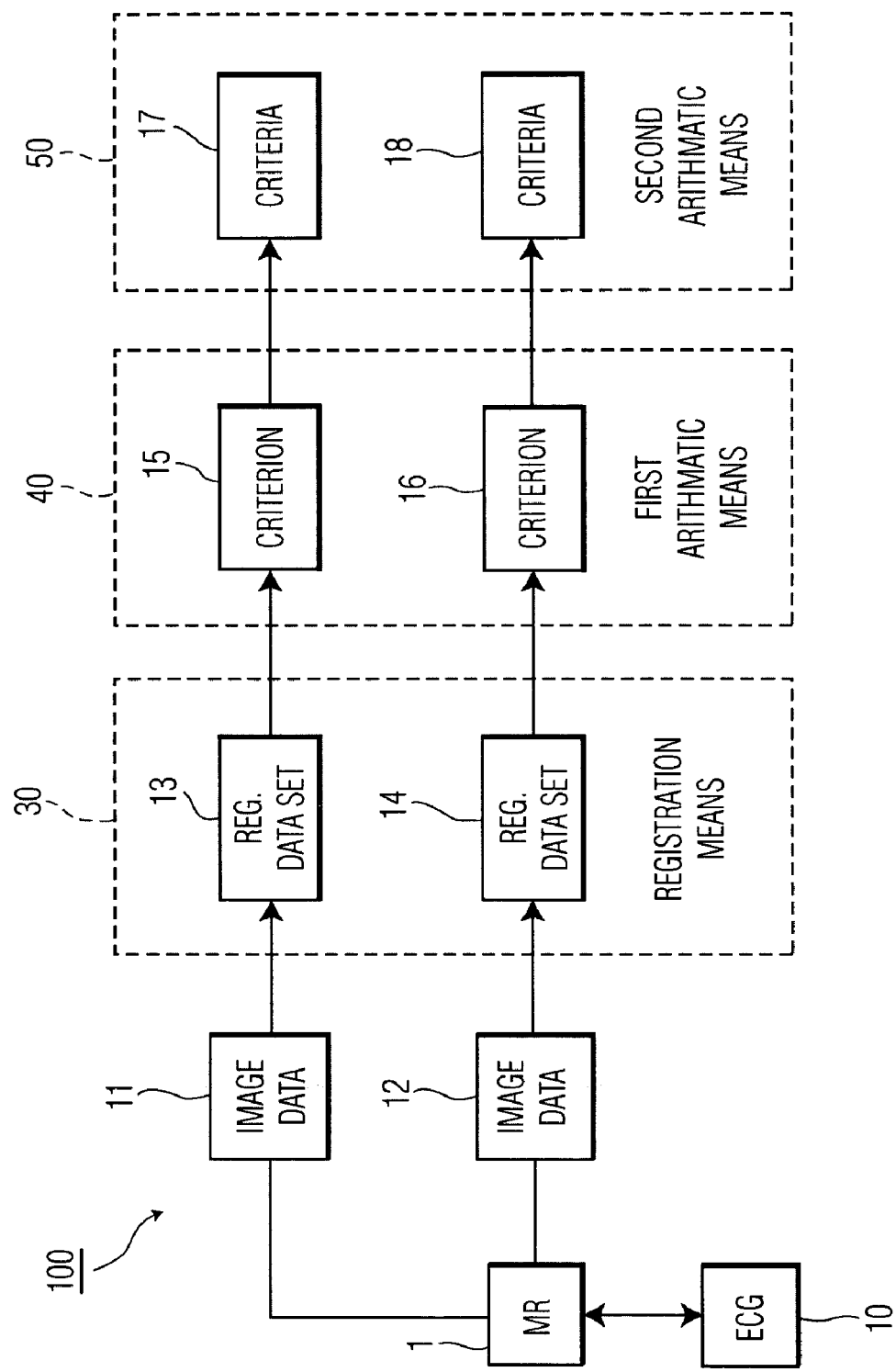

RELIABILITY MEASURE CONCERNING THE REGISTRATION OF CARDIAC MR PERFUSION MEASUREMENTS

The present invention relates to a method of quantifying a reliability of an automatic registration of anatomically corresponding positions in the images in an image data set that includes a series of images.

The invention also relates to a system for carrying out the method in accordance with the invention.

Cardiac MR perfusion measurements form a basis for the diagnosis of patients with constrictions or stenoses in the coronary vessels. Such a study is aimed at comparing a degree of perfusion of the cardiac muscle (myocardium) as measured while the patient is in rest and in stress. In order to analyze the degree of perfusion, for example in rest, an MR image of each time the same cross-section of the myocardium is formed as a function of time. Such an image yields an image data set that comprises a series of, for example, 2-dimensional images that represent substantially the same anatomical cross-section of the myocardium. A pixel value within a region that corresponds to the myocardium represents the degree of perfusion. In order to eliminate the motion artefacts that are caused by motion of the myocardium, the MR images are acquired at one and the same instant in time during the RR interval in the cardiac cycle of the patient. This operation can be performed by means of the R peak triggering technique that is known per se. After the acquisition of the images in rest and in stress, the anatomically corresponding positions of the myocardium in rest and in stress are compared.

A method of determining anatomically corresponding positions, also known as registration, is disclosed in WO 97/17894. The cited document describes a method of realizing automatic registration of scintigraphic images of perfusion measurements in the myocardium. It has been found that the images of a cross-section of the myocardium to be analyzed exhibit shifts, rotations and deformations relative to one another, so that the accuracy of the registration of the corresponding positions in the images in rest and in stress is degraded.

It is an object of the invention to provide a method of automatically registering anatomically corresponding positions in the images in an image data set, which method essentially eliminates shifts, rotations and deformations in the images to be analyzed and quantifies the degree of reliability of such registration. To this end, the method in accordance with the invention includes the steps of performing a registration operation on the image data set so as to obtain a registered image data set, of calculating a first parameter for the registered image data set, of applying a predetermined criterion to the calculated first parameter, and of classifying the degree of reliability of the registration operation in dependence on whether the first parameter satisfies the applied criterion. The image data set comprises a series of images, for example, perfusion images as a function of time of a cross-section of the myocardium in rest or in stress. In this case the image data set comprises images of the same cross-section of the myocardium at different instants. Due to inaccuracies in the R peak triggering, respiration of the patient and possible irregularities in the cardiac cycle of the patient, such cross-sections may be shifted, rotated or deformed relative to one another. The first step of the method in accordance with the invention eliminates the artefacts that are caused by the shifts, rotations and deformations, that is, by carrying out a registration operation. This registration operation can be carried out by means of algorithms of a rigid or a non-rigid transformation that are known per se. In the first case translations and rotations between the images are eliminated and in the second case the deformations in the images are also eliminated. The registration operation yields a registered image data set where the relevant pixels of the successive images within the registered series are situated at corresponding image co-ordinates (i,j) of the imaging plane. Such relevant pixels are, for example, the cross-section of the myocardium. Each individual image in the registered image data set contains a region of relevant pixels, for example, a region that is situated at the center of the image and is surrounded by the non-relevant pixels. It has been found that, in order to enhance the reliability of the further analysis, for example, of the comparison of the cross-section of the myocardium in rest and in stress, it is advantageous to introduce a criterion that indicates the degree of reliability of the registration and is applied to the registered image data set. The registration is classified according to degree of reliability in dependence on the extent to which the images of the registered image data set satisfy said criterion. If a combination of several (for example, two) registered image data sets is required for the analysis of the perfusion measurements, the reliability of the analysis can also be classified in conformity with the classification of the individual registered image data sets.

A version of the method in accordance with the invention is characterized in that the first parameter is a geometrical similarity measure and the predetermined criterion is a threshold imposed on the geometrical similarity measure. Because the registration operation aims to find a transformation function between the images in the image data set, which transformation function comprises transformation parameters, a degree of geometrical similarity between these images is defined as the similarity measure. This similarity measure may be based on a total grey value distribution within the images to be registered. In case the images are two-dimensional, the similarity measure may be based on a histogram. Two different types of similarity measures can be distinguished, for example, mutual information or a common entropy. These types are two-dimensional and are also referred to as "scatter plots". A misalignment of two N-dimensional images gives rise to dispersion of the scatter plot; such dispersion can also be used as the similarity measure.

The following equation is an example of a formule for calculating the mutual information:

$$MI = \sum_{j,k} p_{j,k} \log \frac{p_{j,k}}{p_j p_k}$$

in which $p_{j,k}$ is a probability of a voxel from a reference image having a grey value k where the corresponding voxel in an image to be registered has a grey value j;

$p_j$ is a probability of a pixel having a grey value j;

$p_k$ is a probability of a pixel having a grey value k.

The following equation is an example of a formule for calculating a common entropy:

$$S_{2D} = -\sum_{j,k} \frac{p_{j,k}}{V} \log \frac{p_{j,k}}{V}$$

where V is a volume (or a surface in the case of two-dimensional images) of overlap of a reference image and an image to be registered.

It has been found that when two images correspond only partly, the similarity measure that is calculated on the basis of the mutual information offers better results. This method is also resistant to noise.

A 1-dimensional histogram can also be used as the similarity measure. In case the images are subtracted from one another in order to obtain a differential image, the grey values of this differential image exhibit a wide distribution. This means that a one-dimensional grey value histogram of the differential image can be used as the similarity measure. An example of the formule for calculating the similarity measure in this case is given by the energy U:

$$U = \sum_k (p_k)^2.$$

A further version of the method in accordance with the invention is characterized in that the reliability of the automatic registration of anatomically corresponding positions is classified on the basis of one adjusted threshold that is imposed on the geometrical similarity measure. This version offers fast classification of the already executed registration where only the registered images that satisfy the applied criterion are considered to be accurately registered.

A further version of the method in accordance with the invention is characterized in that the reliability of the automatic registration of anatomically corresponding positions is classified on the basis of two adjusted thresholds that are imposed on the geometrical similarity measures. This version offers a possibility for step-wise classification. This is because the images that do not satisfy one preselected similarity measure are now considered to be inaccurately registered, whereas the images that satisfy a higher similarity measure are considered to be accurately registered and the images that satisfy a similarity measure that lies between said two levels are considered to be images registered with an intermediate accuracy.

Another version yet of the method in accordance with the invention is characterized in that the geometrical similarity measure is applied to at least one combination of two successive images in the registered image data set. The application of the criterion could then be limited to a number of images from the total series acquired, that is, in a situation in which the MR images of the myocardium are acquired with a small difference in time.

Another version of the method in accordance with the invention is applied to a first as well as to a second image data set in order to obtain a first registered image data set and a second registered image data set while the degree of reliability of the registration operation is classified, and also includes the steps of calculating a second parameter for the registered first image data set, of calculating a third parameter for the registered second image data set, and of performing a registration operation on the second parameter relative to the third parameter. As has already been explained, the images of the perfusion of the myocardium, acquired in rest and in stress in substantially the same phase of the cardiac cycle, are compared for diagnostic purposes. The second as well as the third parameter may be a Maximum Intensity Projection (MIP) calculated for the first and for the second registered graphic data set, respectively. The calculation of a Maximum Intensity Projection is known per se. This operation yields one image per registered data set that originally comprises N images, each pixel (i,j) in such an MIP image assuming a maximum intensity value of the pixels (i,j) in the series N of the registered data set. In other words, the maximum intensity values of pixels (i,j), originally distributed across 3 dimensions, are back projected to one plane while maintaining their positions (i,j) in the plane. If the registration operation is classified as being "good", the relevant pixels in the registered data sets are situated at substantially the same co-ordinates. This results in a reliable analysis of the MIP images relative to one another. For the perfusion measurements each pixel within a relevant region of the myocardium represents a degree of perfusion. The registration operation performed on the MIPs yields a table in which a positional relation between the pixels is defined for the anatomically corresponding regions in the images in rest and in stress. This can be realized by calculating a co-ordinate transformation matrix for the anatomically corresponding regions in the two data sets. Using this table, the degree of local perfusion of the myocardium in rest and in stress can be accurately compared.

A further version yet of the method in accordance with the invention is characterized in that the registration operation is performed in a batch job. The possibility of carrying out the registration operation in a batch job, possibly for all patient data to be analyzed, offers additional efficiency in respect of the further processing of the analysis. In this case a registration correction, if any, can be performed only for the images that are classified as being insufficiently reliable or such images can be ignored during the analysis.

A system in accordance with the invention includes an MR apparatus and an ECG apparatus that co-operates with the MR apparatus so as to produce a first and a second image data set, first registration means for performing a registration operation on the image data set so as to obtain a registered image data set, first calculation means for calculating the first parameter and the criterion, and second calculation means for classifying the degree of reliability of the registration operation in dependence on the extent to which the first parameter satisfies the applied criterion.

Figure 2:
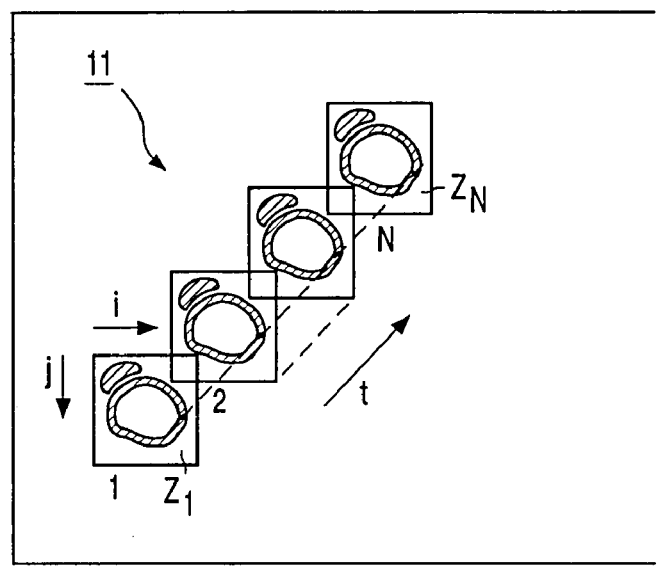
Figure 3:
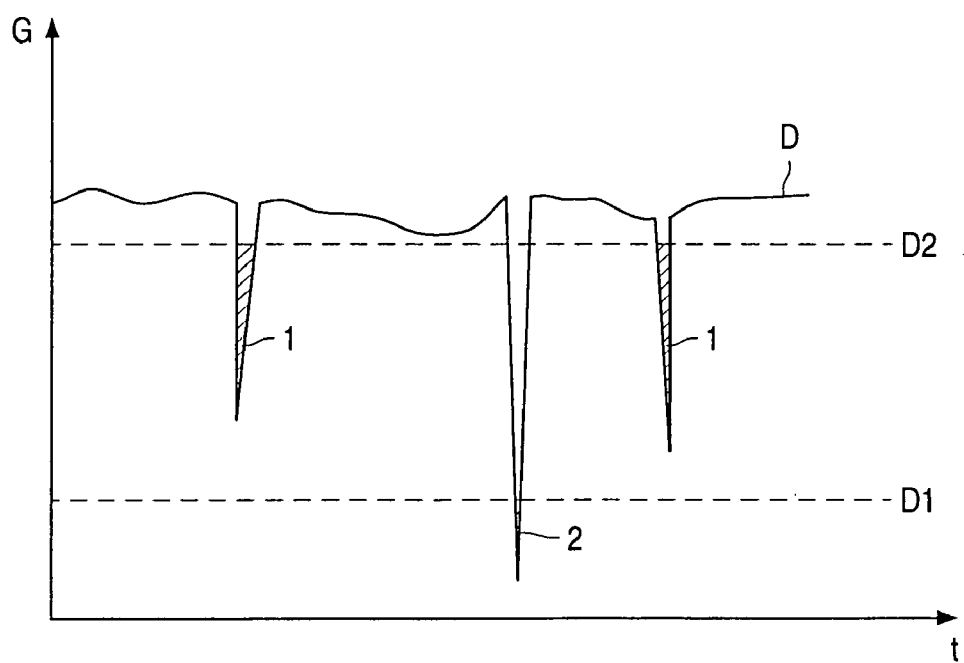

These and other aspects of the invention will be described in detail hereinafter with reference to some figures; therein:

FIG. 1 is a diagrammatic representation of an embodiment of the system for carrying out the method in accordance with the invention, FIG. 2 illustrates diagrammatically the calculation of the criterion, and FIG. 3 illustrates diagrammatically an example of application of predetermined criteria for the classification of the registration operation.

FIG. 1 is a diagrammatic representation of a system for carrying out the method in accordance with the invention. The system 100 includes an MR apparatus 1 and a co-operating ECG apparatus 10 for generating image data sets 11, 12, said image data sets representing two-dimensional images of the myocardium in rest 11 and in stress 12. In order to reduce the motion artefacts of the myocardium, the acquisition of the image data sets is correlated to a phase in the cardiogram, that is, so-called ECG R-peak triggering. The co-operation of an MR apparatus and an ECG apparatus for the acquisition of MR images that are synchronized with a cardiac cycle is known per se from "An ECG Trigger Module for the Acquisition of Cardiac MR Images", Computers in Cardiology, 1994, p. 533. Generally speaking, the acquisitions take place in the diastolic end phase of the cardiac cycle in which the myocardium is quasi-stationary. During the perfusion measurements, MR images are formed of one and the same cross-section of the myocardium, that is, as a function of time, each pixel of the myocardium representing a degree of the local perfusion. For the diagnostic analysis it is important to compare the regions of the myocardium and a degree of perfusion in rest and in stress. The representations of the myocardium in the successive images could be shifted due to the irregularities of the cardiac cycle or for other reasons. This introduces errors in the registration of the images acquired in rest relative to the images acquired in stress. To this end, the system 100 also includes registration means 30 for performing a registration operation so as to obtain a registered image data set. The registration operation results in an image data set that comprises the same number N of two-dimensional images as an original image data set, the relevant and anatomically corresponding pixels of the successive images within each two-dimensional plane being situated at the same image co-ordinates (i,j) in the imaging plane. A cross-section of the myocardium constitutes an example of such relevant pixels. The registration operations are performed by means of the means 30 that may comprise a computer program for applying an algorithm of a rigid or a non-rigid transformation that is known per se. The computer program is stored in a dedicated computer that is not shown in FIG. 1. The registration operation yields a registered image data set 13, 14, the relevant pixels in each two-dimensional image being situated at the same co-ordinates within the imaging plane. The system 100 also includes first arithmetic means 40 for calculating the first parameter and a first criterion 15 and a second criterion 16. A similarity measure, calculated for each registered image data set 13,14, constitutes an example of such a parameter. The criterion is in this case also a similarity measure. The adjusted level of this criterion is predetermined in such a manner that the images that satisfy the criterion exhibit slight mutual shifts of the relevant region. For the similar images it is also feasible for the first criterion to be the same as the second criterion. The first arithmetic means 40 may comprise a computer program for executing the calculation of the first parameter which is in this case also the similarity measure. This calculation will be described in detail hereinafter with reference to FIG. 2. The system also includes second arithmetic means 50 for applying the criterion (15, 16) to the registered data sets (13,14) so as to realize the classification of the degree of reliability of the registration operation. The application of the criteria and the classification (17, 18) of the degree of reliability of the registration operation will be explained hereinafter with reference to FIG. 3.

FIG. 2 shows diagrammatically a characteristic image data set when the perfusion measurement of the myocardium is performed. Assume that a registered graphic data set 11 comprises N images of one and the same cross-section of the myocardium, acquired as a function of time t, and that the index i indicates columns of pixels in an imaging plane and the index j indicates rows of pixels in an imaging plane. Because this image data set comprises the mutually registered images, the relevant pixels (i,j) are situated at substantially the same co-ordinates within each imaging plane. The intensity of a pixel (i,j) within the relevant region is dependent on the quantity of contrast medium present in a volume element or voxel (i,j) at the instant t. The similarity measure G (for example, calculated in conformity with one of the described formulas) for combinations of successive images in the registered image data set indicates the extent to which anatomically corresponding pixels in the relevant region are situated at the same co-ordinates (i,j) in these images.

FIG. 3 shows diagrammatically an example of the application of predetermined criteria for the classification of the registration operation; therein, a variation of the similarity measure G, calculated for the registered image data set, is plotted as a function of time. Two situations can be distinguished. First of all, it is possible to define only one predetermined threshold value D1 for the similarity measure G. In that case all images having a similarity measure G that is below the threshold value D1 (2) are designated to be unreliably registered. It is also possible to define a number of thresholds, for example, two threshold values D1 and D2 for the similarity measure. In that case the images having a similarity measure G that exceeds the threshold value D are designated to be accurately registered whereas the images below the threshold value D1 are designated to be inaccurately registered (2) and the images in the intermediate range are designated to be images that may be unreliably registered (1). During the subsequent analysis, the images of the category "2" may be ignored whereas possibly manual re-registration may be performed for the images of the category "1". When all images have been classified as being accurately registered, the automatic analysis can be accepted without an additional check of the registration operation. When the automatic analysis has been performed in a batch job for all patient data, this option offers an enhanced analysis efficiency.

The invention is not restricted to the above versions, but also covers other feasible types of two-dimensional graphic data sets and also graphic data sets that comprise three-dimensional volume data.

The invention claimed is:

1. A method of quantifying a reliability of an automatic registration of anatomically corresponding positions in the images in an image data set (11, 12) that includes a series of images, which method includes the steps of:
   performing a registration operation (30) on the image data set so as to obtain a registered image data set (13, 14);
   eliminating (30) shifts, rotations and deformations in images to be analyzed;
   calculating a first parameter for the registered image data set (13, 14),
   applying a predetermined criterion (15, 16) to the calculated first parameter;
   classifying a degree of reliability of the registration operation in dependence on whether the first parameter satisfies the applied criterion.

2. A method as claimed in claim 1, in which the first parameter is a geometrical similarity measure and the predetermined criterion is a threshold imposed on the geometrical similarity measure.

3. A method as claimed in claim 2, in which the reliability of the automatic registration of anatomically corresponding positions is classified on the basis of one adjusted threshold (D1) that is imposed on the geometrical similarity measure.

4. A method as claimed in claim 2, in which the reliability of the automatic registration of anatomically corresponding positions is classified on the basis of two adjusted thresholds (Dl, D2) that are imposed on the geometrical similarity measures.

5. A method as claimed in claim 2, in which the geometrical similarity measure is applied to at least one combination of two successive images (N, N+1) in the registered image data set.

6. A method as claimed in claim 1, which method is applied to a first as well as to a second image data set (11, 12) in order to obtain a first registered image data set (13)

and a second registered image data set (14) while the degree of reliability of the registration operation is classified, and also includes the steps of:

calculating a second parameter for the registered first image data set (13);

calculating a third parameter for the registered second image data set (14);

performing a registration operation (30') of the second parameter relative to the third parameter.

7. A method as claimed in claim 1, in which the registration operation is performed in a batch job.

8. A system for carrying out the method claimed in claim 1, which system includes an MR apparatus (1) and an ECG apparatus (10) that co-operates with the MR apparatus so as to produce a first and a second image data set (11, 12), first registration means (30) for performing a registration operation on the image data set so as to obtain a registered image data set (13, 14) and for eliminating shifts, rotations and deformations in images to be analyzed first calculation means (40) for calculating the first parameter and the criterion (15, 16), and second calculation means (50) for classifying (17, 18) the degree of reliability of the registration operation in dependence on the extent to which the first parameter satisfies the applied criterion (15, 16).

9. A method according to claim 1 wherein said applied criterion indicates a degree of reliability of the registration and is applied to said image data set to enhance further analysis of said images to be analyzed.

10. A method according to claim 1 wherein eliminating step is carried out by an algorithm of a rigid transformation to eliminate translations and rotations between said images to be analyzed.

11. A method according to claim 1 wherein eliminating step is carried out by an algorithm of a non-rigid transformation to eliminate deformations between said images to be analyzed.

12. A method according to claim 1 wherein an MR apparatus (1) and an ECG apparatus (10) that co-operates with the MR apparatus to produce said image data set on which said registration operation is performed.

13. A system according to claim 8 wherein said applied criterion indicates a degree of reliability of the registration and is applied to said image data set to enhance further analysis of said images to be analyzed.

14. A system according to claim 8 wherein an algorithm of a rigid transformation eliminates translations and rotations between said images to be analyzed.

15. A system according to claim 8 wherein an algorithm of a non-rigid transformation eliminates deformations between said images to be analyzed.

* * * * *